Sept. 4, 1923.
W. H. READLE
DRAG HANDLE FOR FISHING REELS
Filed Nov. 3, 1922
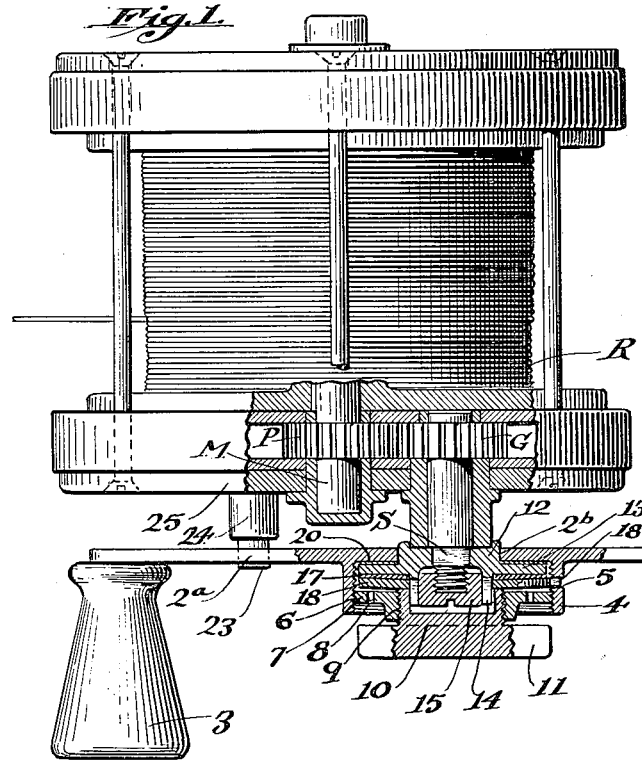
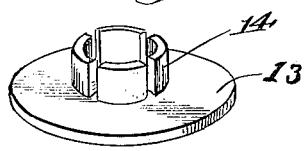
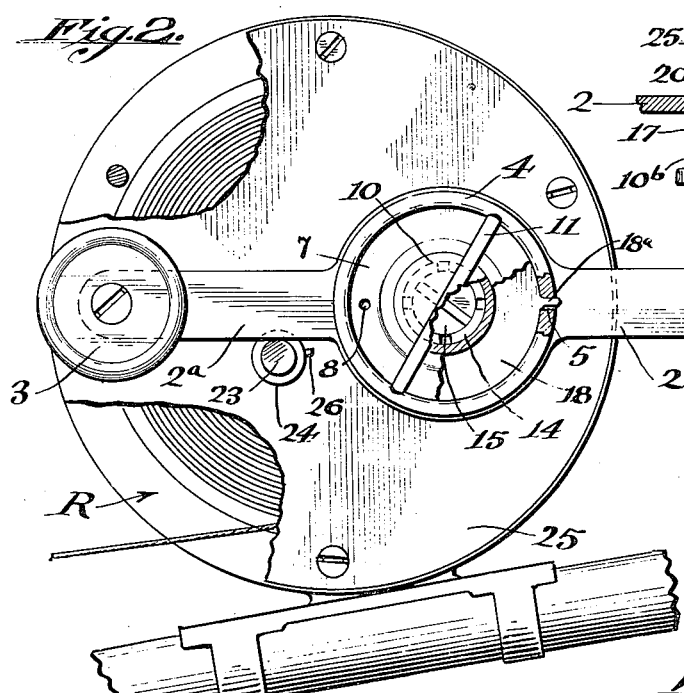
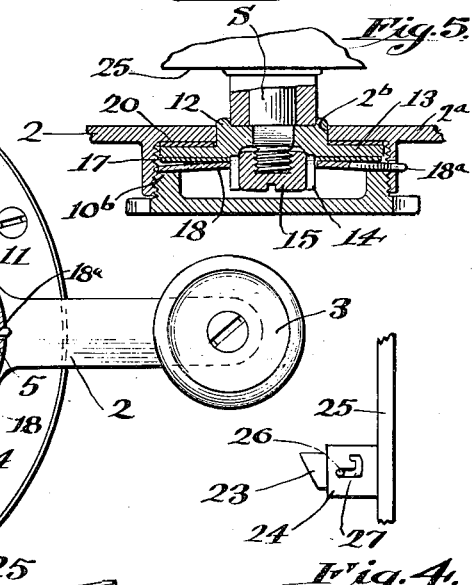
Inventor:
WILLIAM H. READLE.
By Hazard and Miller
Attorneys Patented Sept. 4, 1923.

1,467,250

UNITED STATES PATENT OFFICE.

WILLIAM H. READLE, OF SAN BERNARDINO, CALIFORNIA.

DRAG HANDLE FOR FISHING REELS.

Application filed November 3, 1922. Serial No. 598,963.

*To all whom it may concern:*

Be it known that I, WILLIAM H. READLE, a citizen of the United States, residing at San Bernardino, in the county of San Bernardino and State of California, have invented new and useful Improvements in Drag Handles for Fishing Reels, of which the following is a specification.

This invention relates to fishing reels, and has for its object to provide an improved drag handle for fishing reels.

A further object of the invention is to provide a simple, substantial and reliable crank device with friction means for operating the winding drum of the reel, and such friction means is designed to yield when there is a sufficient degree of drag of the reel so as to prevent the loss of the tackle.

Other objects and advantages will be made manifest in the following specification of embodiments of the invention illustrated in the accompanying drawings, wherein Figure 1 is a plan and sectional detail of the preferred form of the crank mechanism.

Fig. 2 is a side elevation and partial section.

Fig. 3 is a perspective of the fixed hub disc.

Fig. 4 is a detail section of the crank ratchet click.

Fig. 5 is a sectional view of a modified form of the friction drive.

The preferred form of the device is shown in Figs. 1 and 2 as comprising a crank which may consist of oppositely extending crank arms 2 and $2^a$ each provided with rolling handles 3. The crank is provided with a hollow hub 4 on one side and this is provided with an aperture 5. The interior of the hub 4 is threaded at 6 and these threads are engaged by the rim threads of a plate 7 which is provided with apertures 8 to receive a spanner wrench or other means enabling it to be screwed down into the hub 4. The plate 7 is provided with a threaded bore 9 and into this there is turnable a clamping head and pressure controlling device 10. This may be provided with a T or cross bar 11 affording a handle to facilitate screwing of the clamp head 10 in or out as to the plate 7.

The crank arms are provided with a central aperture $2^b$ in which is arranged a hub 12 having a noncircular opening to receive the complementary end of a spindle S which carries on its inner end a gear G driving a pinion P on the main shaft M of the reel R.

The hub 12 is provided with a flange 13 and with a split walled cup 14 into which can be turned a blind nut 15 engaging the threaded end of the spindle S. The nut 15 has a slightly tapered periphery so as to jam in the split wall 14 and be held against accidental loosening.

The crank arms 2—$2^a$ are thus rotatively supported on the hub 12, and for the purpose of transmitting power and providing for a slip clutch between the crank means and the gear spindle S, friction elements are introduced therebetween. Such friction elements include a friction ring 17 bearing against the contiguous face of the flange 13. To regulate the degree of friction, a spring washer or pressure ring 18 is employed. The washer or pressure plate 18 is provided with a radial lug $18^a$ to engage and interlock in the aperture 5 of the hub 4 of the crank. In Fig. 1 the spring washer is shown as of concavo-convex form with the convex side disposed outwardly to be engaged by the contiguous end of the clamp head 10 when this latter is screwed inwardly, so that the concaved marginal portion of the pressure ring 18 is driven against the friction ring 17. Preferably, a washer 20 is introduced between the back of the flange 13 and the contiguous face of the crank member.

A slightly modified form of the friction device is shown in Fig. 5 wherein the concavo-convex driving ring 18 is reversed as to its position in Fig. 1 so that the outer concave face is presented toward a clamp head $10^a$ having a bead $10^b$ to engage the margin of the pressure ring 18 and force the latter against the contiguous friction ring 17.

When the plate 7 is to be adjusted, if a spanner wrench is not convenient, then a simple piece of wire or nail can be inserted in one of the apertures 8 thereof and the T handle 11 can be turned around to bear against the inserted piece and then by applying pressure to the T handle, the plate 7 can be turned in or out.

When it is desired to hold the crank handle 2—$2^a$ against reverse action, this is accomplished by an outwardly spring-pressed ratchet or click 23 mounted in a socket 24 on one of the side plates 25 of the reel. The ratchet or click 23 may be provided with a pin 26 playing in a hook-shaped slot 27 so that while the click may snap in and out as desired, it can also be locked in retracted crank-clearing position by turning the pin 26 under the curved end into the slot 27.

Further embodiments, modifications and changes may be resorted to within the spirit of the invention as here claimed.

What is claimed is:

1. A drag handle for fishing reels comprising, in combination, a drive member adapted to be secured nonrotatively upon the spindle of a reel and having a split, walled cup, a crank device rotatively mounted upon the driving member, friction means for operatively connecting the member and said crank device, means adjustably mounted in the hub of the crank for varying the degree of friction therebetween and means in the cup for securing the driving member to the spindle.

2. A drag reel for fishing tackle comprising, in combination with a driving spindle of the reel, a driving member adapted to be non-rotatively attached to the spindle and having a split, walled, cup-like hub, and a binding nut attachable to the spindle and jamming in the split, walled hub.

3. A drag reel for fishing tackle comprising, in combination with a driving spindle of the reel, a driving member adapted to be non-rotatively attached to the spindle and having a split, walled, cup-like hub, a binding nut attachable to the spindle and jamming in the split, walled hub, a crank device rotatively mounted on the driving member and having a threaded, housing hub, the driving member having a flange disposed in the hub, friction disc means bearing on the flange, a cover plate adjustably mounted on the threads of the housing hub, and a pressure plate disposed between the cover plate and bearing against the said friction disc means for varying the pressure of the friction connection between the crank and the driving member.

4. A drag reel for fishing tackle comprising, in combination with a driving spindle of the reel, a driving member adapted to be non-rotatively attached to the spindle and having a split, walled, cup-like hub, a binding nut attachable to the spindle and jamming in the split, walled hub, a crank device rotatively mounted on the driving member and having an internal, threaded, housing hub, the driving member having a flange disposed in the hub, friction disc means bearing on the flange, a cover plate adjustably mounted on the threads of the housing hub, and a pressure plate disposed between the cover plate and bearing against the said friction disc means for varying the pressure of the friction connection between the crank and the driving member.

5. A drag reel for fishing tackle comprising, in combination with a driving spindle of the reel, a driving member adapted to be non-rotatively attached to the spindle and having a split, walled, cup-like hub, a binding nut attachable to the spindle and jamming in the split, walled hub, a crank device rotatively mounted on the driving member and having a threaded, housing hub, the driving member having a flange disposed in the hub, friction disc means bearing on the flange, and means mounted in the housing hub for varying the frictional resistance between the disc means and the flange.

6. A drag reel for fishing tackle comprising, in combination with a driving spindle of the reel, a driving member adapted to be non-rotatively attached to the spindle and having a split, walled, cup-like hub, a binding nut attachable to the spindle and jamming in the split, walled hub, a crank device rotatively mounted on the driving member and having a threaded, housing hub, the driving member having a flange disposed in the hub, friction disc means bearing on the flange, and means mounted in the housing hub for varying the frictional resistance between the disc means and the flange, said means including a cover plate for the face of the housing hub to enclose the parts mounted in the hub.

7. A drag reel for fishing tackle comprising, in combination with a driving spindle of the reel, a driving member adapted to be non-rotatively attached to the spindle and having a split, walled, cup-like hub, a binding nut attachable to the spindle and jamming in the split, walled hub, a crank device rotatively mounted on the driving member and having a threaded housing hub, the driving member having a flange disposed in the hub, friction disc means bearing on the flange, and means mounted in the housing hub for varying the frictional resistance between the disc means and the flange, said means including a cover plate for the face of the housing hub to enclose the parts mounted in the hub, said plate having a hollow pressure member operative upon the frictional means to regulate the pressure of the same.

8. A drag reel for fishing tackle comprising, in combination with a driving spindle of the reel, a driving member adapted to be non-rotatively attached to the spindle and having a split, walled, cup-like hub, a binding nut attachable to the spindle and jamming in the split, walled hub, a crank device rotatively mounted on the driving member and having a threaded housing hub, the driving member having a flange disposed in the hub, friction disc means bearing on the flange, and means mounted in the housing hub for varying the frictional resistance between the disc means and the flange, said means including a cover plate for the face of the housing hub to enclose the parts mounted in the hub, said plate having a hollow pressure member operative upon the frictional means to regulate the pressure of the same, and which passes over the split hub so as to encompass the binding nut and prevent its dislodgment.

9. A drag reel for fishing tackle comprising, in combination with a driving spindle of the reel, a flanged, driving member adapted to be non-rotatively mounted upon the spindle, means for securing it in applied position on the spindle, a crank having a housing hub in which the flange of the driving member lies, friction means arranged in the housing and including a pressure ring disposed opposite the flange and being attached to the crank to rotate therewith, and means adjustable in the crank hub and bearing upon the said ring for regulating the pressure on the driving flange.

10. A drag reel for fishing tackle comprising, in combination with a driving spindle of the reel, a flanged, driving member adapted to be non-rotatively mounted upon the spindle, a crank having a housing hub in which the flange of the driving member lies, friction means arranged in the housing and including a pressure ring disposed opposite the flange and being attached to the crank to rotate therewith by means of a marginal lug interlocking in the crank hub, and means adjustable in the crank hub and bearing upon the said ring for regulating the pressure on the driving flange.

11. A drag reel for fishing tackle comprising, in combination with a driving spindle of the reel, a flanged, driving member adapted to be non-rotatively mounted upon the spindle, means for securing it in applied position on the spindle, a crank having a housing hub in which the flange of the driving member lies, friction means arranged in the housing and including a pressure ring disposed opposite the flange and being attached to the crank to rotate therewith, and means adjustable in the crank hub and bearing upon the said ring for regulating the pressure on the driving flange, said last named means including a cover plate mounted in the hub and provided with a central pressure head having a handle portion exposed beyond the crank hub.

In testimony whereof I have signed my name to this specification.

WILLIAM H. READLE.